United States Patent
Botha

(10) Patent No.: US 8,620,479 B2
(45) Date of Patent: Dec. 31, 2013

(54) LUBRICATOR DEVICE AND A LUBRICATOR SYSTEM

(76) Inventor: Johan Hendrik Botha, Pretoria (ZA)

( * ) Notice: Subject to any disclaimer, the term of this patent is extended or adjusted under 35 U.S.C. 154(b) by 300 days.

(21) Appl. No.: 12/920,479

(22) PCT Filed: Sep. 8, 2009

(86) PCT No.: PCT/IB2009/053913
§ 371 (c)(1),
(2), (4) Date: Dec. 3, 2010

(87) PCT Pub. No.: WO2010/026559
PCT Pub. Date: Mar. 11, 2010

(65) Prior Publication Data
US 2011/0153094 A1  Jun. 23, 2011

(30) Foreign Application Priority Data
Sep. 8, 2008  (ZA) ................... 2008/07726

(51) Int. Cl.
*F16N 11/08* (2006.01)
*F16N 29/00* (2006.01)
*F16N 29/02* (2006.01)

(52) U.S. Cl.
USPC ......................................... 700/283; 700/231

(58) Field of Classification Search
USPC ................. 700/282, 283, 293, 231, 240, 241
See application file for complete search history.

(56) References Cited

U.S. PATENT DOCUMENTS 6,585,009 B2 * 7/2003 Matthews et al. ............... 141/67
7,951,249 B2 * 5/2011 Kikuchi et al. ................. 156/64
8,322,570 B2 * 12/2012 Beavis et al. ................... 222/52

FOREIGN PATENT DOCUMENTS

DE   29715808 U1   11/1997
DE   29818084 U1   1/1999
DE   10119688 A1   11/2002
DE   202005012870 U1   10/2005

OTHER PUBLICATIONS

International Preliminary Report on Patentability for PCT/IB09/53913, mailed on Mar. 8, 2011.
International Search Report for PCT/IB09/53913, mailed on Dec. 14, 2009.
Written Opinion for PCT/IB09/53913, mailed on Dec. 14, 2009.

* cited by examiner

*Primary Examiner* — Charles Kasenge
(74) *Attorney, Agent, or Firm* — Choate, Hall & Stewart LLP; Charles E. Lyon; Daniel S. Matthews

(57) ABSTRACT

One aspect of the invention provides a lubricator device for dispensing a lubricant to a lubrication point of a machine. The device includes an electric dispensing mechanism including an electronic control circuit. The control circuit includes an RF receiver for receiving control signals, e.g. signals incorporating a lubrication schedule to be adopted by the control circuit, and an RF transmitter for transmitting operational signals incorporating an ID code of the device and at least one operational parameter of the device. Such at least one operational parameter may include one indicative of an amount of lubricant dispensed or one indicative of an error condition. Another aspect of the invention provides a lubrication system including a plurality of lubricator devices, as referred to, and a computer in communication with them for monitoring their operation via operational signals received from them and for controlling their operation via control signals transmitted to them.

18 Claims, 3 Drawing Sheets

LUBRICATOR DEVICE AND A LUBRICATOR SYSTEM

THIS INVENTION relates to a lubricator device and to a lubricator system including such a device.

It is known to provide an automatic single-point lubricator device on an industrial machine for dispensing a lubricant, for example grease, into a lubrication point of the machine. Such a lubricator device includes a container or cartridge containing the lubricant, the container having a connector removably connectable to a lubrication point of a machine. The connector defines an outlet of the container, which outlet is operatively in communication with the lubrication point. The device includes also an electric dispensing mechanism, including a control circuit for controlling its operation. The dispensing mechanism includes a cell for powering it and an actuator mechanism including a drive motor and a plunger for pressurizing the lubricant in the container, thereby to dispense the lubricant from the outlet. The control circuit includes a timer and a means for selecting a time interval for dispensing a predetermined amount of lubricant. The control circuit typically includes a status indicator light for indicating an error condition in operation of the device, for example a blockage or a low cell charge status, should this occur. Such lubricator devices require monitoring of, inter alia, their status indicator lights to ensure that they are operating properly.

Insofar as a lubricator device of the above general type is well known in the art, it requires no further elaboration herein. Any reference herein to a lubricator device is a reference to a lubricator device of this general type or a similar one.

According to a first aspect of the invention there is provided a lubricator device for dispensing a lubricant to a lubrication point of a machine, the lubricator device including:
- a connector removably connectable to the lubrication point and defining a dispensing outlet of the device; and
- an electric dispensing mechanism, including an electronic control circuit controlling operation of the dispensing mechanism, the control circuit including:
  - a processor;
  - a memory module operatively storing therein an ID code of the lubricator device;
  - an RF receiver; and
  - an RF transmitter, in which the control circuit is operable to receive control signals via the RF receiver and to transmit, via the RF transmitter, operational signals incorporating the ID code and at least one operational parameter of the device.

The lubricator device of the invention operatively is provided on a machine and its operation may be controlled and monitored by a computer, as will become apparent from the remainder hereof.

The processor, receiver, and transmitter of the lubricator device may be in the form of a Radio Frequency Identification (RFID) module.

The control circuit may be programmable with a lubrication schedule, by means of received control signals, to control the dispensing mechanism to dispense lubricant according to the lubrication schedule. The lubrication schedule may comprise a series of scheduled dispensing events. So, for example, using a compatible transmitter, a control signal may be transmitted to the control circuit to dispense 20 g of lubricant at 7 day intervals, and the control circuit will power the drive motor accordingly to yield a dispensing event. The control circuit may be programmable to report each dispensing event performed by the lubricator device by transmitting an operational signal incorporating the ID code and an operational parameter indicative of the amount of lubricant dispensed during the dispensing event.

The control circuit may be configurable to store in the memory module a log of the at least one operational parameter over time. The operational signals may include signals representative of the at least one operational parameter over time from the log.

The lubricator device may include an energy cell for powering the dispensing mechanism. In this case, the at least one operational parameter may include a charge level of the cell. Alternatively or additionally, the at least one operational parameter may include a voltage across the cell.

The dispensing mechanism may include an electric motor and the at least one operational parameter may include current through the motor during operation of the motor. This voltage or the current referred to above or both may be indicative of the torque exerted by the motor which, in turn, may be indicative of whether or not dispensing of lubricant is occurring normally. So, for example, excessive torque may be indicative of a blockage of the outlet of the lubricator device, which may result in abnormal dispensing.

The at least one operational parameter may include a parameter indicative of an error condition, should one occur. In this case, the control circuit may be configured to transmit an operational signal incorporating the ID code and the parameter indicative of the error condition in response to occurrence of the error condition.

The control circuit may be configured to transmit an operational signal incorporating the ID code and the at least one operational parameter in response to receipt of an interrogation command included in a control signal received by the RF receiver.

According to a second aspect of the invention there is provided a lubricator system including:
- a plurality of lubricator devices, each in accordance with the first aspect of the invention;
- a computer having a processor, a memory module, and a database stored in the memory module; and
- a communication system operable to communicate between the lubricator devices and the computer, in which the computer is configured to receive via the communication system the ID code and the at least one operational parameter incorporated in each of a plurality of operational signals transmitted by any of the lubricator devices and to store the at least one operational parameter in the database in association with the ID code.

The computer thus provides for centralized monitoring of the operation of the devices.

The computer may be operable to transmit a control signal addressed to at least one of the lubricator devices, i.e. at least one addressee lubricator device, by incorporating the ID code of the lubricator device in the control signal. In this case, the control signal may include a lubrication schedule, the at least one addressee lubricator device being configured to adopt the lubrication schedule in response to receipt of the control signal. Alternatively, the control signal may include an interrogation command, the at least one addressee lubricator device being configured to respond to the interrogation command by transmitting an operational signal incorporating its ID code and the at least one operational parameter.

In a particular implementation of the lubricator system of the second aspect of the invention, each lubricator device is programmed with a lubrication schedule comprising a series of scheduled dispensing events and to report each dispensing event performed by the lubricator device by transmitting an operational signal incorporating the ID code and an operational parameter indicative of the amount of lubricant dispensed during the dispensing event. In this implementation also, the computer may be operable to record in its database each dispensing event reported by each dispensing device in association with the ID code of the device.

The plurality of lubricator devices may be provided on a site, for example a plant. In this case, the communication system may include at least one relay station, having an RF communication module compatible with the RF transmitter and RF receiver of each lubricator device for communicating with them. Communication between the computer and the relay station may be via a telecommunications network, for example a GSM network.

The invention is described below by way of an example of a lubricator system, in accordance with the second aspect of the invention, including a plurality of lubricator devices, each in accordance with the first aspect of the invention, with reference to and as illustrated in the accompanying diagrammatic drawings. In the drawings.

Figure 1:
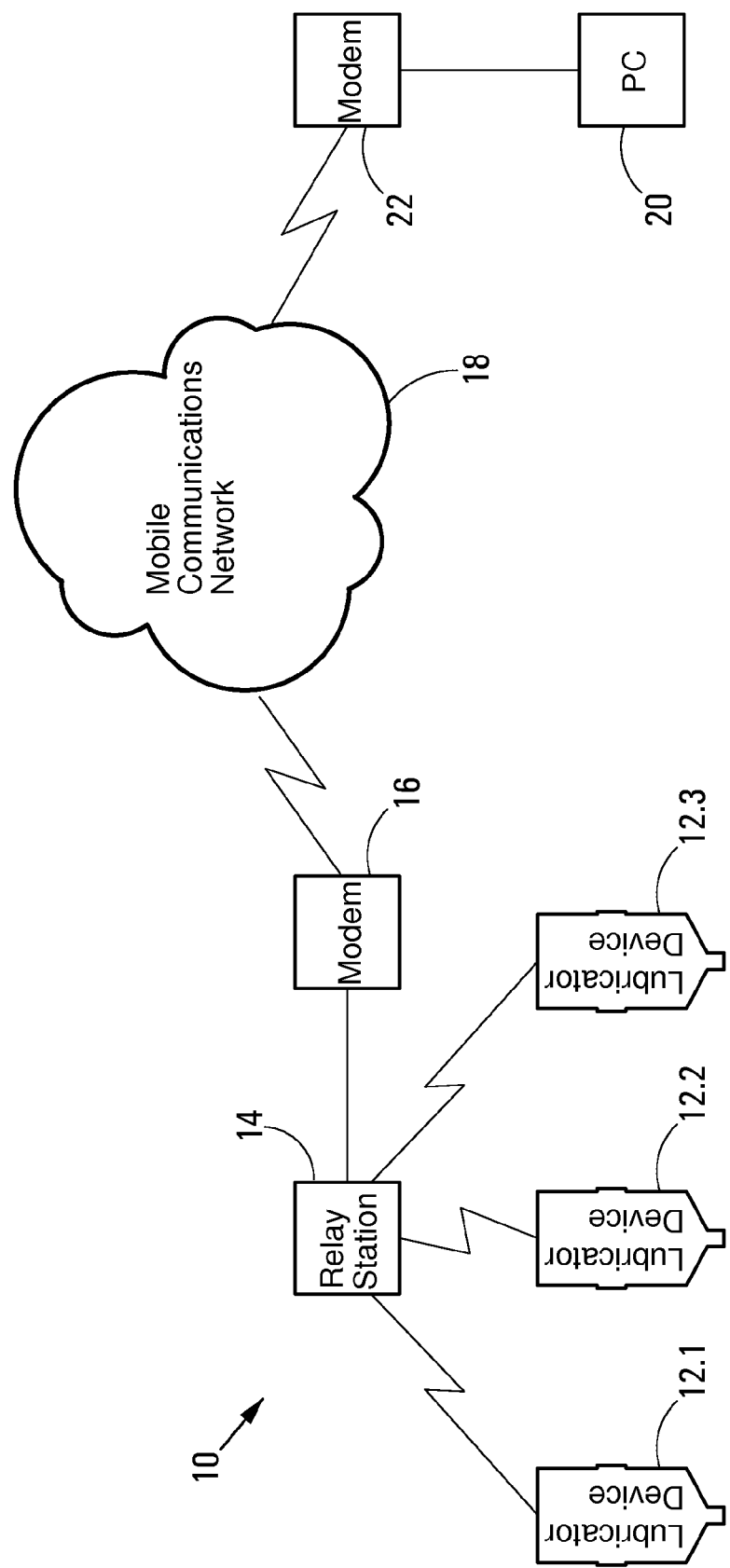
FIG. 1 shows a schematic of a lubricator system, in accordance with the second aspect of the invention.

In FIG. 1, a lubricator system, in accordance with the second aspect of the invention, is designated generally by the reference numeral 10. The lubricator system 10 includes:
three identical lubricator devices 12.1, 12.2, and 12.3, each in accordance with the first aspect of the invention;
a relay station 14 which has a modem 16 for communication via a cellular communications network 18; and
a computer in the form of a PC 20 which has a modem 22 for communication via the network 18.

It is expected that, in a typical implementation of the lubricator system of the invention, there will be more than three lubricator devices. For simplicity, the lubricator system 10 of this example includes only the three identical lubricator devices 12.1, 12.2, and 12.3.

Figure 2:
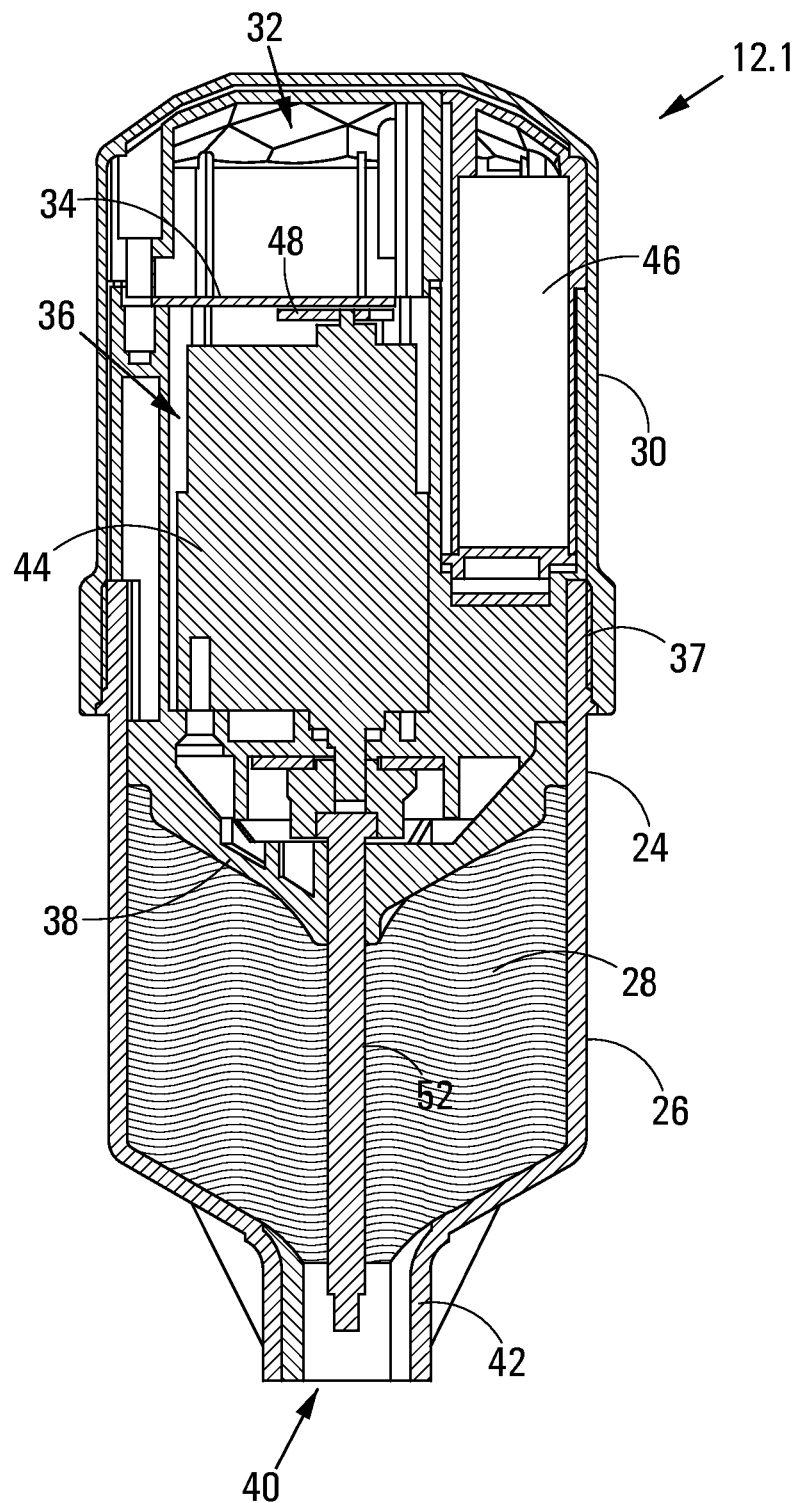
FIG. 2 shows a diagrammatic long section of a lubricator device of the system of FIG. 1, the lubricator device being in accordance with the first aspect of the invention.

With reference to FIG. 2, the lubricator device 12.1 includes a body 24. The body 24 includes a cartridge 26, containing lubricant in the form of grease 28, and a housing 30.

The lubricator device 12.1 includes also an electric dispensing mechanism 32, the mechanism 32 being housed in the housing 30 and including:
an electronic control circuit 34 based on a PC board;
a plunger 38 that acts on the grease 28; and
an actuator mechanism 36 for the plunger 38.

The cartridge 26 has an outlet 40 connectable to a lubrication point on a machine via a connector formation 42 defining an inner screw thread (not shown).

The dispensing mechanism 32 includes a cell 46 for powering it.

The cartridge 26 and the housing 30 define complementary screw threads 37, providing for separation of the cartridge 26 and the housing for the purpose of refilling the cartridge 26 and/or replacing the cell 46.

The actuator mechanism 36 includes an electric drive motor 44 and a drive screw 52 extending through a central hole defined through the plunger 38 and cooperating with an inner screw thread in the hole.

Figure 3:
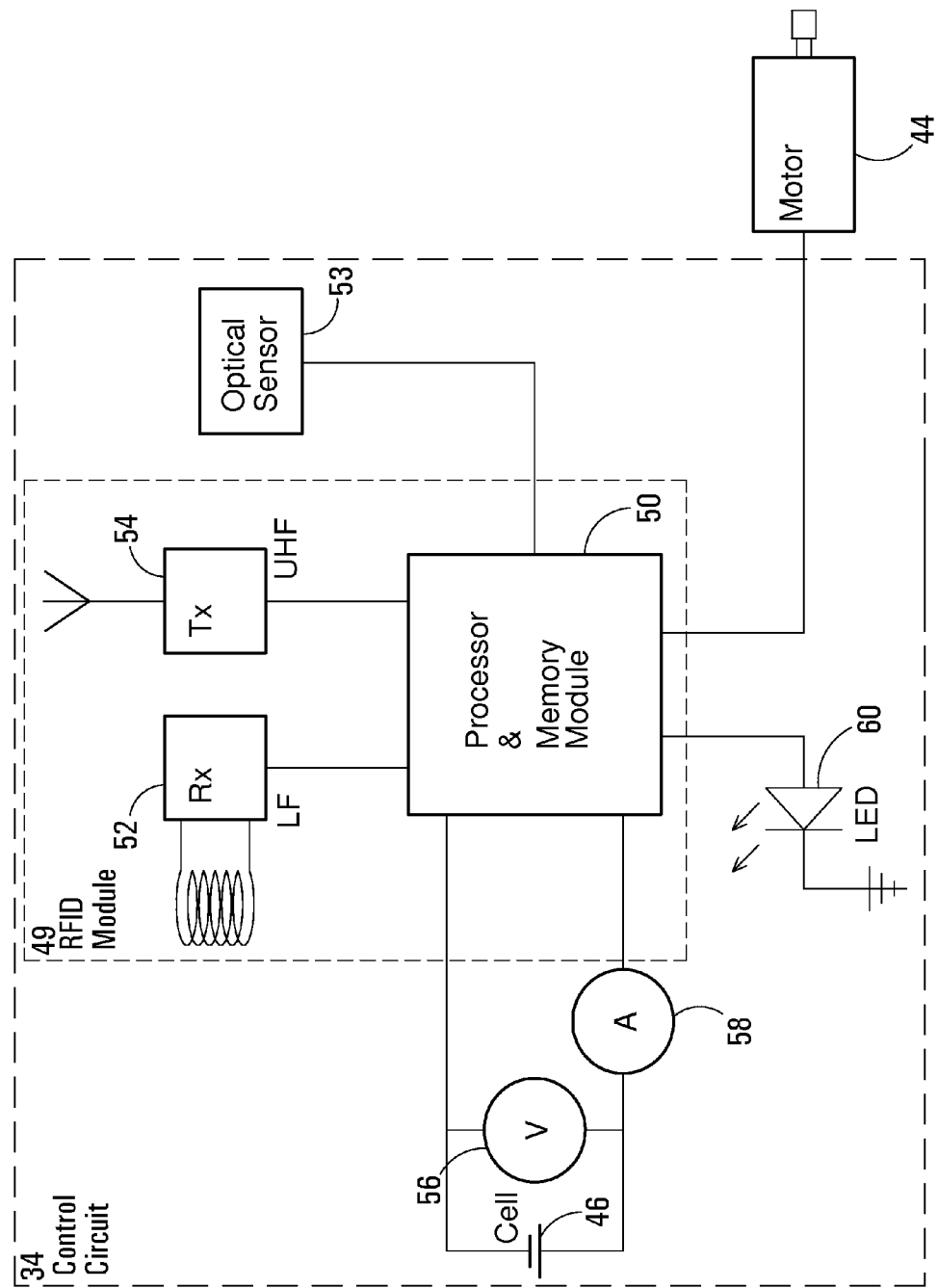
FIG. 3 shows a schematic of a control circuit and a drive motor of the lubricator device of FIG. 2.

The actuator mechanism 36 includes a rotating disc 48, driven by the motor 44 and cooperating with an optical sensor (not shown here, but designated by the reference numeral 53 in FIG. 3) of the control circuit 34 for sensing an operational parameter in the form of the number of operative rotations of the disc 48 and, accordingly, of the screw 52.

In use of the lubricator device 12.1, powering of the drive motor 44 by the control circuit 34 causes the motor to rotate the screw 52, which in turn causes displacement of the plunger 38 towards the outlet 40, pressurizing the grease 28 and dispensing it via the outlet 40. To the extent that features and operation of the device 12.1 are conventional, they are not elaborated on herein.

With reference particularly to FIG. 3, the electronic control circuit 34 includes:
an RFID module 49 including:
a module 50 comprising a processor and a memory module;
a low frequency (for example 125 kHz) receiver 52; and
an ultra high frequency (for example 433 MHz) transmitter 54; the cell 46;
a voltage sensor 56 for measuring an operational parameter in the form of voltage across the cell 46;
a current sensor or ammeter 58 for measuring an operational parameter in the form of current through the cell 46;
a status indicator LED 60; and
the optical sensor 53.

As was mentioned above, the lubricator devices 12.2, and 12.3 of FIG. 1 are identical to the lubricator device 12.1.

With reference particularly to FIG. 1, the relay station 14 includes a transmitter compatible with the receiver of each of the lubricator devices 12.1, 12.2, and 12.3 and a receiver compatible with the transmitter of each of these lubricator devices.

As will be described below, communications are transmitted between each of the lubricator devices 12.1, 12.2, and 12.3 and the PC 20 and such transmissions occur via a communication system comprising the relay station 14, the modem 16, the communications network 18, and the modem 22.

The PC 20 stores therein a database including the ID code of the RFID of each of the lubricator devices 12.1, 12.2, and 12.3. The PC 20 runs software interacting with the database and controlling and monitoring the lubricator devices 12.1, 12.2, and 12.3, as will be described below.

A possible mode of operation of the system 10 will now be described, although those skilled in the art will appreciate that many variations are possible to suit different operational requirements.

Upon any of the lubricator devices 12.1, 12.2, and 12.3, for example the device 12.1, being implemented, it transmits via its transmitter 54 to the PC 20 an operational signal incorporating its ID code. The PC 20 records the ID code in its database. An operator enters a lubrication schedule for the device 12.1 into the PC 20 and the PC transmits a control signal incorporating the lubrication schedule to the device 12.1, which stores it in its module 50. The schedule may, for example, include a single dispensing event of five rotations of the screw 52 (see FIG. 2) once a week. This may, for example, translate into 20 g of grease 28 per week. The RFID module 49 stores this lubrication schedule in the module 50 and intermittently powers the drive motor 44 accordingly. It uses readings from the optical sensor 53 to determine the number of rotations of the screw 52 and de-powers the motor 44 after five rotations.

The module 50 has an algorithm that uses as inputs both voltage, as sensed by the voltage meter 56, and current or amperage, as sensed by the ammeter 58, and therefrom estimates an operational parameter in the form of torque exerted by the motor 44. Should this torque exceed a predetermined threshold value, the algorithm registers an abnormal operating condition, which may be indicative of a blockage, and registers an error condition. This error condition triggers the module 50 to transmit an operational signal incorporating its ID code and the error condition to the PC 20, which records it in its database. The module 50 also activates the LED 60. An operator of the PC 20 monitoring the database and noticing the error condition may then arrange for an inspection of the device 12.1.

Should the voltage measured by the voltage sensor 56 drop below a predetermined threshold value, an error condition is registered by the module 50 and the module 50 transmits its ID code and the error condition to the PC 20, which records it in its database. This may be indicative of a low charge status of the cell 46. The module 50 also activates the LED 60.

Via the PC 20, an operator can send to the module 50 a control signal incorporating an interrogation command, to which the processor will respond by transmitting to the PC an operational signal incorporating the log stored in the processor. The PC will store this log in its database for inspection by an operator.

Optionally, the module 50 may be programmable, for example via a control signal from the PC 20, to report each dispensing event performed by the lubricator device by transmitting an operational signal incorporating the ID code and an operational parameter indicative of the amount of lubricant dispensed, the parameter being for example five rotations of the screw 52. The PC 20 may be programmed to store a log or record of such events in its database, in association with the time of the event and the ID code of the device.

The PC 20 may be used to send a control signal including an interrogation command to the device 12.1 to transmit the lubrication schedule stored therein to the PC.

The above operation described in relation to the lubricator device 12.1 also applies in respect of each of the lubricator devices 12.2 and 12.3.

The relay station 14 may have processing and storage means for collating and storing information from the respective lubricator devices 12.1, 12.2, and 12.3. It may be configured to transmit such stored information to the PC 20 at regular time intervals or predetermined times or upon interrogation by the PC 20.

The system 10 thus provides for centralized control of the operation of the lubricator devices 12.1, 12.2, and 12.3 and for monitoring their operation.

Clearly, the PC 20 may be used to monitor and control different lubricator devices at different sites.

By providing for both monitoring and controlling the lubricator devices 12.1, 12.2, and 12.3, the system 10 prevents under- or over lubrication of machines via the devices, which could result in damage to the machines or costly spillage of lubricant. The system can be configured to give a warning of error conditions such as blockages, lubricator device failures, low battery status, incorrect current, incorrect motor turn speeds, and so forth. The system provides for scaling down of costly on-site visual inspection of lubricator devices.

The invention claimed is:

1. A lubricator device for dispensing a lubricant to a lubrication point of a machine, the lubricator device including:
   a body for containing the lubricant;
   a connector removably connectable to the lubrication point and defining a dispensing outlet for dispensing lubricant from the body to the lubrication point;
   an electric dispensing mechanism operable to control dispensation of the lubricant from the body, the electric dispensing mechanism including an electronic control circuit controlling operation of the dispensing mechanism, the control circuit including:
   a processor;
   a memory module operatively storing therein an ID code of the lubricator device;
   an RF receiver; and
   an RF transmitter; and
   an energy cell for powering the dispensing mechanism,
   in which the control circuit is operable to receive control signals via the RF receiver and to transmit, via the RF transmitter, operational signals incorporating the ID code and at least one operational parameter including at least a charge level of the cell or a voltage across the cell.

2. A lubricator device as claimed in claim 1, in which the control circuit, receiver, and transmitter are in the form of a Radio Frequency Identification (RFID) module.

3. A lubricator device as claimed in claim 1, in which the control circuit is programmable with a lubrication schedule, by means of received control signals, to control the dispensing mechanism to dispense lubricant according to the lubrication schedule.

4. A lubricator device as claimed in claim 3, in which:
   the lubrication schedule comprises a series of scheduled dispensing events; and
   the control circuit is programmable to report each dispensing event performed by the lubricator device by transmitting an operational signal incorporating the ID code and an operational parameter indicative of the amount of lubricant dispensed during the dispensing event.

5. A lubricator device as claimed in claim 1, in which the control circuit is configurable to store in the memory module a log of the at least one operational parameter over time.

6. A lubricator device as claimed in claim 5, in which the operational signals include signals representative of the at least one operational parameter over time from the log.

7. A lubricator device as claimed in claim 1, in which the dispensing mechanism includes an electric motor and the at least one operational parameter includes current through the motor during operation of the motor.

8. A lubricator device as claimed in claim 1, in which the at least one operational parameter includes a parameter indicative of an amount of lubricant dispensed by the dispensing mechanism.

9. A lubricator device as claimed in claim 1, in which the at least one operational parameter includes a parameter indicative of an error condition, should one occur.

10. A lubricator device as claimed in claim 9, in which the control circuit is configured to transmit an operational signal incorporating the ID code and the parameter indicative of the error condition in response to occurrence of the error condition.

11. A lubricator device as claimed in claim 1, in which the control circuit is configured to transmit an operational signal incorporating the ID code and the at least one operational parameter in response to receipt of an interrogation command included in a control signal received by the RF receiver.

12. A lubricator system including:
   a plurality of lubricator devices, each as claimed in claim 1;
   a computer having a processor, a memory module, and a database stored in the memory module; and
   a communication system operable to communicate between the lubricator devices and the computer,
in which the computer is configured to receive via the communication system the ID code and the at least one operational parameter incorporated in each of a plurality of operational signals transmitted by any of the lubricator devices and to store the at least one operational parameter in the database in association with the ID code.

13. A lubricator system as claimed in claim 12, in which the computer is operable to transmit a control signal addressed to at least one of the lubricator devices, i.e. at least one addressee lubricator device, by incorporating the ID code of the lubricator device in the control signal.

14. A lubricator system as claimed in claim 13, in which the control signal includes a lubrication schedule, the at least one addressee lubricator device being configured to adopt the lubrication schedule in response to receipt of the control signal.

15. A lubricator system as claimed in claim 13, in which the control signal includes an interrogation command, the at least one addressee lubricator device being configured to respond to the interrogation command by transmitting an operational signal incorporating its ID code and the at least one operational parameter.

16. A lubricator system as claimed in claim 12, in which:

the control circuit of each lubricator device is programmed with a lubrication schedule comprising a series of scheduled dispensing events and to report each dispensing event performed by the lubricator device by transmitting an operational signal incorporating the ID code and an operational parameter indicative of the amount of lubricant dispensed during the dispensing event; and the computer is operable to record in its database each dispensing event reported by each dispensing device in association with the ID code of the device.

17. A lubricator system as claimed in claim 12, in which the communication system includes at least one relay station, having an RF communication module compatible with the RF transmitter and RF receiver of each lubricator device for communicating with them.

18. A lubricator system as claimed in claim 17, in which communication between the computer and the relay station is via a telecommunications network.

* * * * *